United States Patent

[11] 3,610,826

[72] Inventors Charles A. Frumusa; William E. Shaffer, both of Rochester, N.Y.

[21] Appl. No. 860,209
[22] Filed Sept. 23, 1969
[45] Patented Oct. 5, 1971
[73] Assignee Stromberg-Carlson Corporation Rochester, N.Y.

[54] SELECTIVELY SHUNTED RELAY PULSING CIRCUIT
12 Claims, 1 Drawing Fig.

[52] U.S. Cl. .......... 179/78, 179/16 E
[51] Int. Cl. .......... H04m 7/00
[50] Field of Search .......... 179/16 E, 16 EA, 16 F, 78, 174; 307/93, 100; 317/11, 50, 125 RM, 155.5 A, 157, 16, 148.5 B, DIG. 6; 335/193

[56] References Cited
UNITED STATES PATENTS

| | | | |
|---|---|---|---|
| 2,422,309 | 6/1947 | McCreary | 179/16 E |
| 3,189,796 | 6/1965 | Tipton | 317/DIG. 6;148.5 |
| 3,253,789 | 5/1966 | Wouk | 317/50 |
| 3,287,608 | 11/1966 | Pokrant | 317/142 |
| 3,375,405 | 3/1968 | Fallon et al. | 317/16 |
| 3,405,322 | 10/1968 | Milberger et al. | 317/50 |

*Primary Examiner*—Kathleen H. Claffy
*Assistant Examiner*—Jan S. Black
*Attorney*—Charles C. Krawczyk

ABSTRACT: A control device, such as a relay or saturable reactor, is connected across a pair of conductors that are adapted to be connected to a telephone line to function as a pulsing circuit. A switching circuit applies a momentary low impedance path across the control device when the connected telephone line is switched from a closed to an open circuit condition and reduces the effect of the reactive components in the telephone loop on the switching response of the relay.

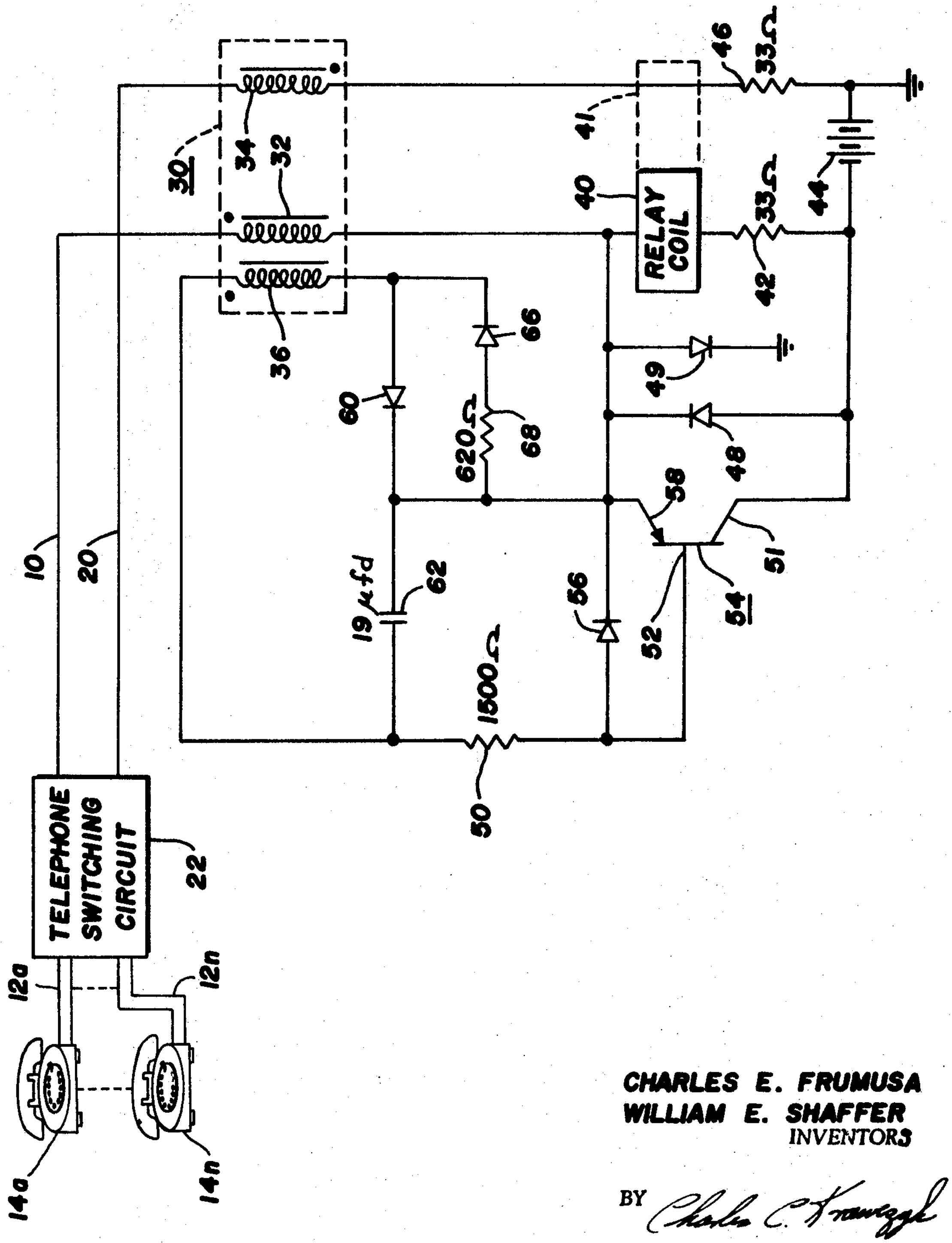
CHARLES E. FRUMUSA
WILLIAM E. SHAFFER
INVENTORS
BY Charles C. Krawczyk
ATTORNEY

SELECTIVELY SHUNTED RELAY PULSING CIRCUIT

BACKGROUND OF THE INVENTION

This invention relates to switching circuits in general, and more particularly to circuits responsive to telephone supervisory and control signals, such as dial pulses.

In recent years there has been an increased emphasis on the use of more sensitive and faster responding control devices in telephone systems to provide quicker and better service. For example, saturable reactors and lower inertia and faster responding pulsing relays are presently being applied to telephone circuits for control by telephone supervisory and control signals. However, such sensitive control devices, under various conditions, tend to produce distorted output pulses that at times exceed acceptable limits, and in the case of relays, tend to produce undesirable spurious or additional contact closures.

Telephone systems generally employ pulsing circuits that can be connected to any one of a large number of subscriber telephone lines. Each telephone line generally presents a different electrical characteristic depending upon its length, gauge, leakage, connected telephone set, etc. Each telephone line, therefore, presents a different value of capacitance, inductance and resistance between the subscriber's dial and the associated pulsing circuit so that the operating conditions of the pulsing circuit change with each telephone line connection. Furthermore, due to the high cost of copper, there is a general tendency to use smaller diameter conductors to reduce costs. However, the telephone lines including the smaller conductors exhibit a higher resistance per unit length, and may at times exhibit higher capacitance per unit length. Therefore, the length of such telephone lines become an increasing important factor in determining the electrical characteristics of the telephone loop.

The change in operating conditions between different line connections is particularly noticeable in central offices wherein higher supply voltages are used to assure that the required amount of line current flows through higher resistance long line connections. The higher potentials and the various reactive components in the telephone loop tend to interact to apply distorted current pulses through the control device resulting in improper circuit operation, and in the case of pulsing relays, enhance the conditions under which undesirable spurious contact closures are generated.

Normally in the standard step-by-step switching system such distorted current pulses (within limits) and such spurious contact closures (within limits) generally do not create a problem, since the inertia of the step-by-step switching devices is sufficiently high that the distorted pulses and spurious contact closures do not seriously affect the operation of the system. However, in electronic switching systems and step-by-step systems modified to include electronic switching circuits, the response time may be such that the circuit will incorrectly respond to the distorted current pulses and/or spurious contact closures and result in erroneous switching.

The circuit of the invention overcomes the disadvantages of the prior art by reducing the effects of the reactive components in telephone lines and sets on the switching response of pulsing circuits.

It is therefore an object of this invention to provide an improved relay pulsing circuit including circuit means for reducing the likelihood of spurious contact closures.

It is also another object of this invention to reduce the effect of capacitive and inductive components on the switching response of a relay pulsing circuit.

It is still another object of this invention to provide an improved relay pulsing circuit that can be used with short and long telephone lines and still provide accurate pulsing.

BRIEF DESCRIPTION OF THE INVENTION

Circuit means connect an inductive control device, such as a relay or a saturable reactor in a direct current circuit to a pair of conductors that are adapted to be connected to a telephone line, so that the control device is energized when a closed circuit condition is exhibited by the connected telephone line. A switching circuit is connected across a portion of the direct current series circuit including at least the control device. A control circuit detects when the telephone line is open circuited and actuates the switching circuit to provide a low-impedance path across the control device thereby reducing the effect of the reactive components in the telephone loop on the switching response of the control device.

BRIEF DESCRIPTION OF THE FIGURE

The FIGURE includes a schematic diagram of a supervisory and control signal detection circuit including the invention.

DESCRIPTION OF THE PREFERRED EMBODIMENT

The pulsing circuit of the FIGURE is connected to a pair of central office conductors 10 and 20 generally designated as the tip and ring conductors, or a transmit pair. The relay circuit may, for example, be a portion of a selector circuit or a connector circuit in a step-by-step system, or a portion of a register circuit or junctor circuit in a common control system. The central office conductors 10 and 20 are adapted to be connected to any one of a large number of subscriber telephone lines **12*a*–12*n* and to their connected telephone sets 14*a*–14 through a switching circuit 22** that can be any of the above-mentioned telephone switching circuits.

The telephone lines **12*a*–12*n* of the FIGURE can be terminated by the telephone sets 14*a*–14*n* of the type fully described in an article entitled "An Improved Circuit for the Telephone Set" by A. F. Bennett in "The Bell System Technical Journal," May 1953, Pages 611–625. The telephone set includes an alternating current ringer circuit for connection across a telephone line. The ringer circuit generally includes a ringer coil in series with a capacitor. The telephone dial includes contacts that alternately apply and remove a direct current circuit across the telephone line and ringer circuit at a predetermined rate to produce dial pulses having a preset time duration (within specified standard limits). In effect, during dialing alternate open and closed circuit conditions are exhibited across the connected telephone lime and the conductors 10 and 20**.

The pulsing circuit, when energized by an "off hook" condition in a connected telephone set **14*a*–14*n*** applies power to the telephone set and is actuated by the open and closed circuit conditions (supervisory and control signals) in the telephone set to provide corresponding relay operations that function to control the operation of various telephone switching circuits to establish the desired telephone connection. In the case of modern faster responding switching systems, such as for example, systems employing electronic switching circuits, it very important that the pulsing relays respond to the supervisory and control signals to provide accurate signal pulsing. The reactive components in the telephone set, in the telephone line and in pulsing circuit tend to react in a manner to distort the current pulses applied to the pulsing control device from that of the operation of the dial contacts. Hence, the response of the control device to the distorted current pulses may result in generating output pulses that do not conform to the dial pulses, such as for example, by extending or shortening the time duration of the pulses. Furthermore, any oscillatory condition in the current pulse through the control device may result in a greater number of pulses, or undesirable added contact closures in the case of relays. The relay pulsing circuit of the FIGURE including the invention reduces the effect of capacitive and inductive components on a relay pulsing circuit and thereby provides improved circuit operation.

A transformer 30 has two primary windings 32 and 34 and a secondary winding 36. The dots on the transformer windings 32 and 34 and 36 conventionally indicate the phase relationship between the windings. One end of the primary winding 32 is connected to the conductor 10 while the other end is connected through an inductive control device illustrated as a coil 40 of a relay and a current limiting resistor 42 to a negative terminal of a central office power source 44. One end of the primary winding 34 is connected to the conductor 20, while the other end is connected through a current limiting resistor 46 to a positive terminal of the central office power source 44 and to ground. If desired, a second relay coil 41 (illustrated by dashed lines) can be connected between the resistor 46 and the primary winding 34. It is to be understood, however, that other types of control devices, such as for example, saturable reactors, can be used instead of a relay. The direct current series circuit including the relay coil 40, resistors 42 and 46 and the windings 32 and 34 is energized by the source 44 in response to a closed circuit condition in a telephone line connected to the conductors 10 and 20. The resistors 42 and 46 function to limit the amount of current flow in the direct current circuit so that the circuit can be connected to low- and high-resistance telephone lines. A pair of diodes 48 and 49 are connected between the junction of winding 32 and relay coil 40 and opposite sides of the source 44 to provide a protection circuit against transient signals due to lightning, etc.

The collector and emitter electrodes 51 and 58 or a transistor 54 are connected across a portion of the direct current series circuit including the resistor 42 and the relay coil 40. The transistor 54 functions as a switching circuit responsive to a control signal to provide a low-impedance path across the resistor 42 and relay coil 40. The transistor 54 is rendered conductive by a control signal developed across a capacitor 62 connected at one end to the emitter electrode 58 and at the other end through a current limiting resistor 50 to the base electrode 52. A bidirectional rectifying circuit, including a diode 60 connected in parallel with a series circuit including a resistor 68 and a diode 66, is connected in series with the capacitor 62 across the secondary winding 36. A diode 56 is connected between the base electrode 52 and the emitter electrode 58 to limit the magnitude of a reverse bias that can be applied thereto.

When a connected telephone line exhibits a closed circuit across the conductors 10 and 20, such as an "off hook" condition or during the closed circuit portion of dial pulses, current supplied by the source 44 flows through the telephone loop and the relay coil 40 is energized. The initial surge of current flow through the windings 32 and 34 is in a direction to develop a potential across the winding 36 having a polarity to forward bias the diode 66. A charge is developed across the capacitor 62 that reverse biases the transistor 54. When the telephone line is subsequently open circuited, the flux in the transformer 30 collapses to produce a short signal of opposite polarity signal across the transformer winding 36. The signal across the winding 36 momentarily forward biases the diode 60 to reverse the charge across the capacitor 62 and forward biases the transistor 54 to render the transistor conductive, thereby applying a low-impedance path across the relay coil 40 and the resistor 42. The low-impedance path allows the magnetic flux in the relay coil to rapidly collapse to provide a more uniform switching pulse and also greatly reduces the probability of spurious contact closures.

When the telephone line is subsequently closed, the polarity of the signal across the winding 36 reverses to forward bias the diode 66 to charge the capacitor 62 in a direction to render the transistor 54 nonconductive.

In effect, the transistor 54 functions as a switching circuit to momentarily apply a low-impedance path across the relay coil 40 each time a connected telephone line switches from a closed circuit condition to an open circuit condition. The circuit components are selected to have values so that the transistor 54 is forward biased for a sufficient length of time so that the magnetic flux in the relay is sufficiently collapsed to deactivate the relay. When the circuit is open circuited, such as by dialing the stored electrical energy in the telephone loop, due to the collapse of magnetic flux in the inductive components and the charge stored in the capacitive components, is in a direction to maintain the current flow through the relay coil. The low-impedance path of the transistor 54 (when conductive) diverts a large amount of the current flow from the relay coil 40 and thereby allows the relay coil to be more rapidly deenergized. The resistance 42 in series with the relay coil 40 increases the impedance of the relay coil circuit with respect to the impedance path of the transistor 54 thereby rendering the low-impedance path more effective. The resistance 42 also reduces the inductance-to-resistance factor and thereby increases the rate at which the magnetic flux of the relay coil collapses.

The circuit of the invention has been found to be particularly advantageous when used with long line connections wherein higher voltages are employed and the reactive circuit components are generally of their highest level. It is found that switching a low-impedance path across the relay increases the speed at which the relay can be deenergized and also substantially reduces the sensitivity of the relay to the reactive components in the telephone loop.

In addition to the foregoing, the circuit of the FIGURE has the advantage of exhibiting a very high input impedance to communication signals being transmitted by the conductors 10 and 20. This is particularly important since any loading effect upon a telephone line undesirably reduces the signal transmission efficiency of the system. In most systems low-impedance type relays, such as reed-type relays, cannot be used in detection circuits in which the relay coil is connected directly across the telephone line without undesirably loading the circuit. In the circuit of the FIGURE the primary windings 32 and 34, in addition to sensing the change in current, also function as reactive elements connected in series with the relay coil 40 to increase the input impedance of the circuit to a point that the loading effect of the relay coil is substantially negligible.

What is claimed is:

1. A relay and associated circuit for use in a telephone switching system or the like comprising:

an inductive control device;

circuit means connecting said control device in a direct current circuit to a pair of conductors adapted to be connected to a telephone line so that said control device is actuated in response to a closed circuit condition exhibited by said telephone line and is deactuated by an open circuit condition exhibited by said telephone line, and circuit means coupled to said direct current circuit for detecting when said direct current circuit is open circuited to momentarily switch a low-impedance path across said control device.

2. A pulsing circuit responsive to open circuit and closed circuit conditions exhibited by a pair of signal lines comprising:

a pair of power terminals for connection to a source of unidirectional energizing potential;

a pair of input terminals for connection to the pair of signal lines;

a control device having a coil;

a transformer including a primary winding and a secondary winding;

circuit means connecting said coil and said primary winding in a direct current circuit between said power terminals and said input terminals so that the relay is energized when the signal lines exhibit a closed circuit condition;

a switching circuit connected across a portion of said direct current circuit including at least said coil to provide a low-impedance path across said portion of said direct current circuit in response to a control signal, and control circuit means coupled between said secondary winding and said switching circuit for applying said control signal to said switching circuit when said signal lines are switched from a closed circuit condition to an open circuit condition.

3. A pulsing circuit as set forth in claim 2 wherein said switching circuit includes a transistor with the emitter and collector electrodes of said transistor connected across said portion of said series circuit.

4. A pulsing circuit as set forth in claim 2 wherein said detection circuit includes a rectifying circuit for rectifying the signal developed across said secondary winding when said signal lines are switched from the closed circuit condition to the open circuit condition to develop said control signal.

5. A telephone supervisory and control signal detector circuit comprising:

a pair of conductors adapted for connection to a telephone line;

a relay having a coil;

a transformer having a secondary winding and a pair of primary windings, one end of each of said primary windings being connected to separate ones of said conductors;

a pair of power terminals for connection to opposite terminals of a direct current power source;

circuit means connecting said relay coil in a direct current series circuit between one of said power terminals and the other end of one of said primary windings;

circuit means connecting the other end of the other primary winding to said other power terminal in a direct current series circuit so that said primary windings are poled to aid in the generation of magnetic flux in response to a current flow therethrough;

a transistor;

circuit means for connecting the emitter and collector electrodes of said transistor across a portion of said series circuit including at least said relay coil;

rectifying circuit means connected to said secondary winding so that when the current collapses in said primary winding said rectifying circuit means develops a control signal, and circuit means coupling said rectifying circuit to the emitter and base of said transistor for applying said control signals thereto to render said transistor conductive.

6. A telephone supervisory and control signal detector circuit as set forth in claim 5 wherein said rectifying circuit means includes a bidirectional rectifying circuit coupled in series with a capacitor and said secondary winding.

7. A telephone supervisory and control circuit as set forth in claim 5 wherein said circuit means for connecting said relay coil in said circuit includes a resistance series connected in series with one end of said relay coil; and said emitter and collector electrodes of said transistor are connected across said series combination of said relay coil and said resistance.

8. An electrical circuit comprising:

a control device having a coil;

switching means responsive to a control signal for switching from a nonconductive state to a conductive state;

a pair of power terminals for connection to a direct current power source;

a pair of input terminals for connection to a switching circuit for applying open and closed circuits across said input terminals;

circuit means connecting said coil in a direct current series circuit between said power and input terminals so that said coil is energized when a direct current closed circuit is exhibited across said pair of input terminals;

circuit means connecting said switching means across a portion of said series circuit including at least said coil, and control circuit means coupled between said series circuit and said switching means for detecting when an open circuit is exhibited across said pair of input terminals to apply a control signal to said switching means to momentarily render said switching means conductive.

9. An electrical circuit as defined in claim 8 wherein said control circuit includes:

inductive means connected in said series circuit for providing a signal when the current flow through said series circuit is interrupted, and control circuit means coupled between said inductive means and said switching means for applying said control signal to said switching means having a controlled time duration in response to the signal from said inductive means.

10. An electrical circuit as defined in claim 9 wherein:

said switching means comprises a transistor, and said control circuit means includes capacitive means coupled to the base and emitter of said control transistor, and a rectifying circuit coupled between said capacitive means and said inductive means for applying a charge across said capacitive means for rendering said transistor momentarily conductive.

11. In a telephone system including an exchange having switching means, a plurality of subscriber telephone sets, a telephone line individually connecting each telephone set to the switching means for selecting individual ones of said telephone lines, and a direct current power source, a pulsing circuit comprising:

a control device including a coil responsive to be actuated by a current flow therethrough;

a switching circuit responsive to a control signal for switching between a high-impedance state and a low-impedance state;

circuit means connecting said coil in a direct current series circuit between said exchange switching means and said power source so that said exchange switching means can connect said series circuit to a telephone line, wherein the series circuit and a connected telephone line and telephone set define a telephone loop connection and wherein said control device is actuated by a closed circuit condition in a connected telephone set;

circuit means connecting said switching circuit across a portion of said circuit including at least said coil, and a control circuit coupled to said series circuit and said switching circuit for detecting when said telephone loop is switched from a closed to an open circuit condition for applying a control signal to said switching circuit for momentarily switching said switching circuit to said low-impedance state.

12. A telephone system as defined in claim 11 wherein said switching circuit is switched to said low-impedance state by said control circuit for a period of time in the order of the open circuit portion of a telephone dialing pulse.